(12) United States Patent
Gao

(10) Patent No.: US 11,601,954 B2
(45) Date of Patent: Mar. 7, 2023

(54) DATA SENDING METHOD AND APPARATUS, STORAGE MEDIUM, AND SENDING END

(71) Applicant: SPREADTRUM COMMUNICATIONS (SHANGHAI) CO., LTD., Shanghai (CN)

(72) Inventor: Xinghang Gao, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 93 days.

(21) Appl. No.: 17/265,981

(22) PCT Filed: Jun. 26, 2019

(86) PCT No.: PCT/CN2019/092982
§ 371 (c)(1),
(2) Date: Feb. 4, 2021

(87) PCT Pub. No.: WO2020/029699
PCT Pub. Date: Feb. 13, 2020

(65) Prior Publication Data
US 2021/0314969 A1    Oct. 7, 2021

(30) Foreign Application Priority Data
Aug. 10, 2018 (CN) .......................... 201810908301.2

(51) Int. Cl.
*H04W 76/15* (2018.01)
*H04W 72/12* (2023.01)
(Continued)

(52) U.S. Cl.
CPC ....... *H04W 72/1205* (2013.01); *H04W 28/12* (2013.01); *H04W 76/15* (2018.02); *H04W 80/02* (2013.01)

(58) Field of Classification Search
None
See application file for complete search history.

(56) References Cited

U.S. PATENT DOCUMENTS

2010/0130219 A1    5/2010   Cave et al.
2016/0057585 A1    2/2016   Horn et al.
(Continued)

FOREIGN PATENT DOCUMENTS

CN    201733326 U    2/2011
CN    102131275 A    7/2011
(Continued)

OTHER PUBLICATIONS

Huawei, HiSilicon, "Logical Channel ID Allocation for PDCP Duplication" 3GPP TSG-RAN WG2#102, Busan,Korea, May 21-25, 2018; R2-1807487; Revision of R2-1804663; 5 pages.
(Continued)

*Primary Examiner* — The Hy Nguyen
(74) *Attorney, Agent, or Firm* — Cantor Colburn LLP

(57) ABSTRACT

A data sending method and apparatus, a storage medium, and a sending end. The method includes: determining an activation instruction, the activation instruction using multiple bits to indicate sending end logical channels to be used of each RB; and for each RB, a sending end PDCP entity duplicates a PDCP data packet according to the number n of the sending end logical channels to be used of the RB, and sends the duplicated PDCP data packets to a receiving end by means of the sending end logical channels to be used, the maximum value of the number n of the sending end logical channels of each RB being greater than 2. The solution of the present invention can improve the accuracy of an instruction, thereby facilitating improving transmission resource utilization efficiency.

21 Claims, 6 Drawing Sheets determining an activation instruction which comprises multiple bits to indicate sending end logical channels to be used for each RB  ⟵ S31 for each RB, according to a number n of the sending end logical channels to be used for the RB, a sending end PDCP entity duplicating a PDCP data packet and sending duplicated PDCP data packets to a receiving end through the sending end logical channels to be used; wherein a maximum value of the number n of the sending end logical channels to be used for each RB is greater than 2  ⟵ S32

(51) Int. Cl.
*H04W 28/12* (2009.01)
*H04W 80/02* (2009.01)

(56) References Cited

U.S. PATENT DOCUMENTS

| | | |
|---|---|---|
| 2016/0255619 A1 | 9/2016 | Yi et al. |
| 2018/0132220 A1 | 5/2018 | Jang et al. |
| 2018/0199315 A1 | 7/2018 | Hong et al. |
| 2019/0289489 A1 | 9/2019 | Yi et al. |
| 2019/0327639 A1 | 10/2019 | Huang et al. |
| 2020/0128599 A1* | 4/2020 | Tang .................. H04W 72/1268 |
| 2020/0245330 A1 | 7/2020 | Jiang |
| 2021/0297899 A1* | 9/2021 | Baek ..................... H04W 48/16 |

FOREIGN PATENT DOCUMENTS

| | | | |
|---|---|---|---|
| CN | 105493423 A | 4/2016 | |
| CN | 105659690 A | 6/2016 | |
| CN | 107147479 A | 9/2017 | |
| CN | 107438976 A | 12/2017 | |
| CN | 107734546 A | 2/2018 | |
| CN | 108270516 A | 7/2018 | |
| CN | 108282823 A | 7/2018 | |
| CN | 108353408 A | 7/2018 | |
| EP | 3499922 A1 | 6/2019 | |
| WO | 2018028061 A1 | 2/2018 | |
| WO | 2018143600 A1 | 8/2018 | |

OTHER PUBLICATIONS

International Search Report for International Application No. PCT/CN2019/092982; dated Sep. 27, 2019.
EPO Extended European Search Report for corresponding EP Application No. 19846311.9; dated Apr. 5, 2022.
Huawei, "Leftover Issues of MAC CE activation/deactivation of PDCP duplication," 3GPP TSG-RAN2 Meeting #103; R2-1812075; resubmission of R2-1808348; Aug. 20-24, 2018; 3 pages.
IPIN First Office Action for corresponding IN Application No. 202117007688; dated Jan. 18, 2022.

* cited by examiner determining an activation instruction which comprises multiple bits to indicate sending end logical channels to be used for each RB — S31 for each RB, according to a number n of the sending end logical channels to be used for the RB, a sending end PDCP entity duplicating a PDCP data packet and sending duplicated PDCP data packets to a receiving end through the sending end logical channels to be used; wherein a maximum value of the number n of the sending end logical channels to be used for each RB is greater than 2 — S32

FIG. 3

DATA SENDING METHOD AND APPARATUS, STORAGE MEDIUM, AND SENDING END

CROSS-REFERENCE TO RELATED APPLICATIONS

This is the U.S. national stage of International Application No. PCT/CN2019/092982, filed on Jun. 26, 2019. Priority under 35 U.S.C. § 119(a) and 35 U.S.C. § 365(b) is claimed from Chinese Patent Application No. 201810908301.2, filed on Aug. 10, 2018, the entire disclosure of which is incorporated herein by reference.

TECHNICAL FIELD

The present disclosure generally relates to communication technology field, and more particularly, to a data sending method and device, a storage medium and a sending end.

BACKGROUND

With the development of wireless communication technology, 3GPP has introduced New Radio (NR) access technology to meet the demand of larger data volume and smaller transmission delay. This technology is also known as the fifth-generation mobile communication technology (5G).

In 5G, two new technologies are introduced: Packet Data Convergence Protocol (PDCP) duplication function and Band Width Part (BWP).

Specifically, the PDCP replication function is introduced to improve the reliability of Ultra Reliable Low Latency Communication (URLLC) service transmission. More specifically, a PDCP data packet is duplicated into two same duplicates at a PDCP layer of a sending end, where the two same duplicates are sent to two different Radio Link Control (RLC) entities respectively, and then sent through different sending end Logical Channels (LCH). When the two duplicates are successfully received, a PDCP layer at a receiving end keeps one of them and deletes the other one. In other words, a data packet is duplicated into two same duplicates and transmitted through two different channels, thereby improving the reliability of data transmission. And the PDCP data packet may include a PDCP Protocol Data Unit (PDU) and a PDCP Service Data Unit (SDU).

However, for multi-connectivity duplication, a radio bearer (RB) configured with duplication function may be configured with more than two wireless data legs. For each RB, it is not clear to use only one bit to indicate how many sending end logical channels to be used are used to send duplicated PDCP data packets, and which sending end logical channels to be used are used for data transmission. Specifically, one bit only includes two states of 0/1, that is, it can only be used to indicate two logical channels, and cannot clearly indicate the use of multi-connectivity duplication.

SUMMARY

Embodiments of the present disclosure provide a data sending method and device, a storage medium and a sending end, which can improve accuracy of instructions, thereby improving efficiency of transmission resource utilization.

In an embodiment of the present disclosure, a data sending method is provided, including: determining an activation instruction which includes multiple bits to indicate sending end logical channels to be used for each Radio Bearer (RB); and for each RB, according to a number n of the sending end logical channels to be used for the RB, a sending end Packet Data Convergence Protocol (PDCP) entity duplicating a PDCP data packet and sending duplicated PDCP data packets to a receiving end through the sending end logical channels to be used; wherein a maximum value of the number n of the sending end logical channels to be used for each RB is greater than 2.

Optionally, each of the multiple bits indicates whether a corresponding sending end logical channel is a sending end logical channel to be used; wherein each bit of the multiple bits has a one-to-one mapping relationship with each sending end logical channel.

Optionally, the one-to-one mapping relationship between each bit of the multiple bits and each sending end logical channel is predefined.

Optionally, before determining the activation instruction, the data sending method further includes: determining a PDCP duplication configuration information, wherein the PDCP duplication configuration information includes a mapping relationship between each sending end PDCP entity and a sending end logical channel, and the one-to-one mapping relationship between each bit of the multiple bits and each sending end logical channel; wherein each RB corresponds to a sending end PDCP entity.

Optionally, the PDCP duplication configuration information further includes a mapping relationship between the sending end logical channels and sub-bands.

Optionally, in a Carrier Aggregation (CA) duplication, RBs indicated by the multiple bits in the activation instruction are arranged in an order of sequence numbers of the RBs, and the bits indicating a same RB are arranged in an order of sequence numbers of the sending end logical channels; and wherein the order of sequence numbers of the RBs and the order of sequence numbers of the sending end logical channels are ascending or descending, and the order of sequence numbers of the RBs and the order of sequence numbers of the sending end logical channels are same or different.

Optionally, in a Dual Connectivity (DC) duplication, RBs indicated by the multiple bits in the activation instruction are arranged in an order of sequence numbers of the RBs, and the bits indicating a same RB are arranged in an order of sequence numbers of sending end Media Access Control (MAC) layers; and wherein the order of sequence numbers of the RBs and the order of sequence numbers of the sending end MAC layers are ascending or descending, and the order of sequence numbers of the RBs and the order of sequence numbers of the sending end MAC layers are same or different.

Optionally, a value of the multiple bits indicating a RB indicates the number n of the sending end logical channels to be used for each RB, where the sending end logical channels of each RB are arranged in a preset order, and according to the preset order, top n sending end logical channels are selected as the sending end logical channels to be used for each RB.

Optionally, before determining the activation instruction, the data sending method further includes: determining a PDCP duplication configuration information, wherein the PDCP duplication configuration information includes a mapping relationship between each PDCP entity and each sending end logical channel, and the preset order of the sending end logical channels of each RB.

Optionally, the PDCP duplication configuration information further includes a mapping relationship between the sending end logical channels and sub-bands.

Optionally, a number of bits used to indicate the sending end logical channels to be used for each RB is determined according to a following formula: $b_i=\lceil \log_2(n_i+1) \rceil$; wherein $b_i$ represents a number of bits in the activation instruction indicating sending end logical channels to be used for an i-th RB; and $n_i$ represents a number of sending end logical channels of the i-th RB.

Optionally, the multiple bits used to indicate the sending end logical channels to be used for each RB are a preset number of bits, and before determining the activation instruction, the data sending method further includes: determining a PDCP duplication configuration information, wherein the PDCP duplication configuration information includes a mapping relationship between each PDCP entity and each sending end logical channel, the preset order of the sending end logical channels of each RB, and the preset number of bits.

Optionally, before determining the activation instruction, the data sending method further includes: determining a PDCP duplication configuration information, wherein the PDCP duplication configuration information includes a mapping relationship between each PDCP entity and each sending end logical channel, the preset order of the sending end logical channels of each RB, and a preset value of a maximum number of the sending end logical channels of each RB.

Optionally, a number of bits used to indicate the sending end logical channels to be used for each RB is determined according to a following formula: $b_i=\lceil \log_2(N+1) \rceil$; wherein $b_i$ represents a number of bits in the activation instruction indicating sending end logical channels to be used for an i-th RB; and N represents the maximum number of the sending end logical channels of each RB.

Optionally, the PDCP duplication configuration information further includes a mapping relationship between the sending end logical channels and sub-bands.

In an embodiment of the present disclosure, a data sending device is provided, including: an activation determination module, adapted to determine an activation instruction which includes multiple bits to indicate sending end logical channels to be used for each Radio Bearer (RB); and a sending module, adapted to, for each RB, send duplicated Packet Data Convergence Protocol (PDCP) data packets to a receiving end through the sending end logical channels to be used, wherein the duplicated PDCP data packets are generated by a sending end PDCP entity duplicating a PDCP data packet according to a number n of the sending end logical channels to be used for the RB; wherein a maximum value of the number n of the sending end logical channels to be used for each RB is greater than 2.

Optionally, each of the multiple bits indicates whether a corresponding sending end logical channel is a sending end logical channel to be used; wherein each bit of the multiple bits has a one-to-one mapping relationship with each sending end logical channel.

Optionally, the one-to-one mapping relationship between each bit of the multiple bits and each sending end logical channel is predefined.

Optionally, the data sending device further includes: a first configuration information determining module, adapted to, before determining the activation instruction, determine a PDCP duplication configuration information, wherein the PDCP duplication configuration information includes a mapping relationship between each sending end PDCP entity and a sending end logical channel, and the one-to-one mapping relationship between each bit of the multiple bits and each sending end logical channel; wherein each RB corresponds to a sending end PDCP entity.

Optionally, the PDCP duplication configuration information further includes a mapping relationship between the sending end logical channels and sub-bands.

Optionally, in a Carrier Aggregation (CA) duplication, RBs indicated by the multiple bits in the activation instruction are arranged in an order of sequence numbers of the RBs, and the bits indicating a same RB are arranged in an order of sequence numbers of the sending end logical channels; and wherein the order of sequence numbers of the RBs and the order of sequence numbers of the sending end logical channels are ascending or descending, and the order of sequence numbers of the RBs and the order of sequence numbers of the sending end logical channels are same or different.

Optionally, in a Dual Connectivity (DC) duplication, RBs indicated by the multiple bits in the activation instruction are arranged in an order of sequence numbers of the RBs, and the bits indicating a same RB are arranged in an order of sequence numbers of sending end Media Access Control (MAC) layers; and wherein the order of sequence numbers of the RBs and the order of sequence numbers of the sending end MAC layers are ascending or descending, and the order of sequence numbers of the RBs and the order of sequence numbers of the sending end MAC layers are same or different.

Optionally, a value of the multiple bits indicating a RB indicates the number n of the sending end logical channels to be used for each RB, where the sending end logical channels of each RB are arranged in a preset order, and according to the preset order, top n sending end logical channels are selected as the sending end logical channels to be used for each RB.

Optionally, the data sending device further includes: a second configuration information determining module, adapted to, before determining the activation instruction, determine a PDCP duplication configuration information, wherein the PDCP duplication configuration information includes a mapping relationship between each PDCP entity and each sending end logical channel, and the preset order of the sending end logical channels of each RB.

Optionally, the PDCP duplication configuration information further includes a mapping relationship between the sending end logical channels and sub-bands.

Optionally, a number of bits used to indicate the sending end logical channels to be used for each RB is determined according to a following formula: $b_i=\lceil \log_2(n_i+1) \rceil$; wherein $b_i$ represents a number of bits in the activation instruction indicating sending end logical channels to be used for an i-th RB; and $n_i$ represents a number of sending end logical channels of the i-th RB.

Optionally, the multiple bits used to indicate the sending end logical channels to be used for each RB are a preset number of bits, and the data sending device further includes: a third configuration information determining module, adapted to determine a PDCP duplication configuration information before determining the activation instruction, wherein the PDCP duplication configuration information includes a mapping relationship between each PDCP entity and each sending end logical channel, the preset order of the sending end logical channels of each RB, and the preset number of bits.

Optionally, the data sending device further includes: a fourth configuration information determining module, adapted to determine a PDCP duplication configuration information, wherein the PDCP duplication configuration information includes a mapping relationship between each PDCP entity and each sending end logical channel, the preset order of the sending end logical channels of each RB, and a preset value of a maximum number of the sending end logical channels of each RB.

Optionally, a number of bits used to indicate the sending end logical channels to be used for each RB is determined according to a following formula: $b_i=\lceil \log_2(N+1) \rceil$; wherein $b_i$ represents a number of bits in the activation instruction indicating sending end logical channels to be used for an i-th RB; and N represents the maximum number of the sending end logical channels of each RB.

Optionally, the PDCP duplication configuration information further includes a mapping relationship between the sending end logical channels and sub-bands.

In an embodiment of the present disclosure, a storage medium having computer instructions stored therein is provided, wherein once the computer instructions are executed, the above data sending method is performed.

In an embodiment of the present disclosure, a sending end including a memory and a processor is provided, wherein the memory has computer instructions stored therein, and when the processor executes the computer instructions, the above data sending method is performed.

Embodiments of the present disclosure may provide following advantages.

In embodiments of the present disclosure, multiple bits are used to indicate sending end logical channels to be used for each RB by setting an activation instruction. However in prior art, only one bit is used to indicate sending end logical channels to be used for each RB, which is not clear in the case of multiple-connectivity duplication. According to the embodiments of the present disclosure, when a maximum number n of sending end logical channels of each RB is greater than 2, multiple bits are used to indicate, which facilitates to improve the accuracy of indication and improve the efficiency of transmission resource utilization.

Further, the activation instruction uses each of the multiple bits of the activation instruction to indicate whether a corresponding sending end logical channel is a sending end logical channel to be used, so that the sending end can determine whether a sender logical channel corresponding to each bit of the multiple bits is a sending logical channel to be used, so that the sending end logical channel to be used is determined when data needs to be sent.

Further, a value of the multiple bits indicating a RB indicates the number n of the sending end logical channels to be used for each RB, where the sending end logical channels of each RB are arranged in a preset order, and according to the preset order, top n sending end logical channels are selected as the sending end logical channels to be used for each RB. In the embodiment of the present disclosure, the sending end may use fewer bits to indicate the sending end logical channels to be used, so that the sending end can determine the sending end logical channels to be used of each RB according to the value of the multiple bits indicating the RB and the preset order, and determine the sending end logical channels when data needs to be sent.

Further, the multiple bits used to indicate the sending end logical channels to be used for each RB are a preset number of bits, and the PDCP duplication configuration information includes a mapping relationship between each PDCP entity and each sending end logical channel, the preset order of the sending end logical channels of each RB and the preset number of bits. According to the embodiments of the present disclosure, a preset number of bits may be used to represent each RB in a received instruction, and the sending end may separate the multiple bits corresponding to each RB without calculation, which facilitates to reduce computational complexity.

BRIEF DESCRIPTION OF THE DRAWINGS

FIG. 3 schematically illustrates a flow chart of a data sending method according to an embodiment;

DETAILED DESCRIPTION

In prior art, activation/deactivation mechanism of two-leg duplication mode is supported. Specifically, for each Radio Bearer (RB) configured with duplication function, a bit is used to indicate activation or deactivation of the duplication function of the RB. The activation of the duplication function can be used to instruct a PDCP to perform duplication operation and both two legs can be used for data transmission; the deactivation of the duplication function can be used to instruct the PDCP not to perform duplication operation and only a primary leg can be used for data transmission.

However, for multi-connectivity duplication, an RB configured with duplication function may be configured with more than two wireless data legs. For each RB, it is not clear to use only one bit to indicate how many sending end logical channels to be used are used to send duplicated PDCP data packets, and which sending end logical channels to be used are used for data transmission. Specifically, one bit only includes two states of 0/1, that is, it can only be used to indicate two logical channels, and cannot clearly indicate the use of multi-connectivity duplication.

Figure 1:
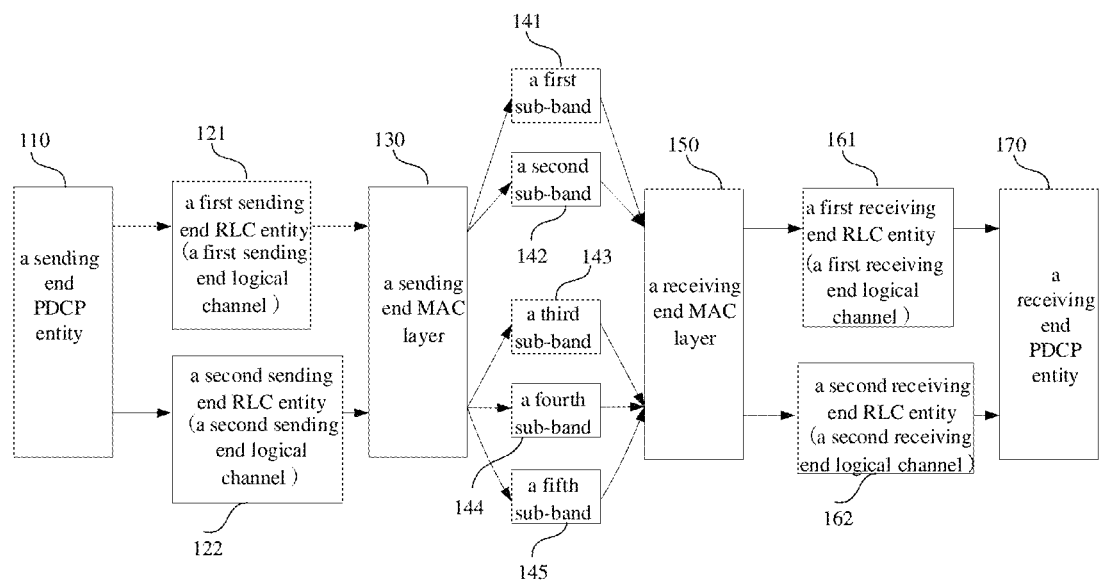
FIG. 1 schematically illustrates a working scenario diagram of a data sending method in prior art.

Referring to FIG. 1, FIG. 1 schematically illustrate a working scenario diagram of a data sending method in prior art. The data sending method may be used in a PDCP duplication function architecture in a Carrier Aggregation (CA) scenario.

In the data sending method, a sending end PDCP entity 110 sends PDCP data packets to a first sending end RLC entity 121 and a second sending end RLC entity 122 respectively, and the PDCP data packets are sent to a sending end Medium Access Control (MAC) layer 130 through a first sending end logical channel corresponding to the first sending end RLC entity 121 and a second sending end logical channel corresponding to the second sending end RLC entity 122 respectively.

Since the first sending end logical channel and the second sending end logical channel are respectively mapped to different sub-bands, the PDCP data packets will be sent through different sub-bands respectively. For example, a PDCP data packet sent by the first sending end logical channel will be sent through a first sub-band 141 and a second sub-band 142, and a PDCP data packet sent by the second sending end logical channel will be sent through a third sub-band 143, a fourth sub-band 144 and a fifth sub-band 145.

Further, a receiving end MAC layer 150 receives the PDCP data packets through different sub-bands, such as the first sub-band 141, the second sub-band 142, the third sub-band 143, the fourth sub-band 144 and the fifth sub-band 145, respectively. And the PDCP data packets will be uploaded to a first receiving end RLC entity 161 and a second receiving end RLC entity 162 correspondingly, and then be uploaded to a receiving end PDCP entity 170 the through a first receiving end logical channel corresponding to the first receiving end RLC entity 161 and a second receiving end logical channel corresponding to the second receiving end RLC entity 162.

Specifically, each leg may be a path from the sending end PDCP entity 110 to the receiving end PDCP entity 170, for example, from a sending end PDCP entity, a sending end RLC entity, a sending end MAC layer, a sub-band, a receiving end MSC layer, a receiving end RLC entity, to a receiving end PDCP entity.

In the existing PDCP duplication function architecture in the CA scenario, a plurality of steps, such as configuration, activation and deactivation may be performed to realize the duplication function.

Specifically, in the configuration step, a network side (for example, a base station) may use a Radio Resource Control (RRC) message to configure PDCP duplication function for multiple RBs, and establish an additional duplication RLC entity for each RB; wherein the RRC message may also indicate a sub-band Cell group ID and a Logic Channel ID (LCID) of a main RLC entity. The RRC message may also set a duplication initial state for the RBs (for example, activation/deactivation).

In the CA scenario, usually only one MAC entity is needed. Through the RRC message, the two RLC entities are also configured to be mapped to different carriers respectively.

Furthermore, after the configuration step is completed, the activation step is needed to perform the duplication function. The activation/deactivation step is performed by sending an activation/deactivation MAC control element (CE) from the network side. The MAC CE includes a bitmap, where each bit of the bitmap corresponds to a RB configured with duplication. Specifically, if a certain bit corresponding to a certain RB is configured with 1, it indicates to activate the certain RB; and if a certain bit corresponding to a certain RB is configured with 0, it indicates to deactivate the certain RB.

The RB may include a Data Radio Bearer (DRB) and a Signaling Radio Bearer (SRB).

In the activation step, after a certain RB configured with duplication is activated, the PDCP layer duplicates the data packet and sends the two same duplicated PDCP Protocol Data Units (PDUs) to two RLC entities corresponding to the RB respectively, and the two RLC entities will send the two same duplicated PDCP PDUs respectively.

In the deactivation step, after a certain RB configured with duplication is deactivated, a corresponding restriction between a corresponding logical channel (LCH) and a carrier is cancelled; the sending end PDCP layer will not duplicate new data packets. The new data packets will be sent to a primary RLC entity (ie, a primary LCH), and not to a secondary RLC entity (ie, a secondary LCH). In addition, the sending end PDCP entity will notify the secondary RLC entity to cancel data stored in the secondary LCH.

Figure 2:
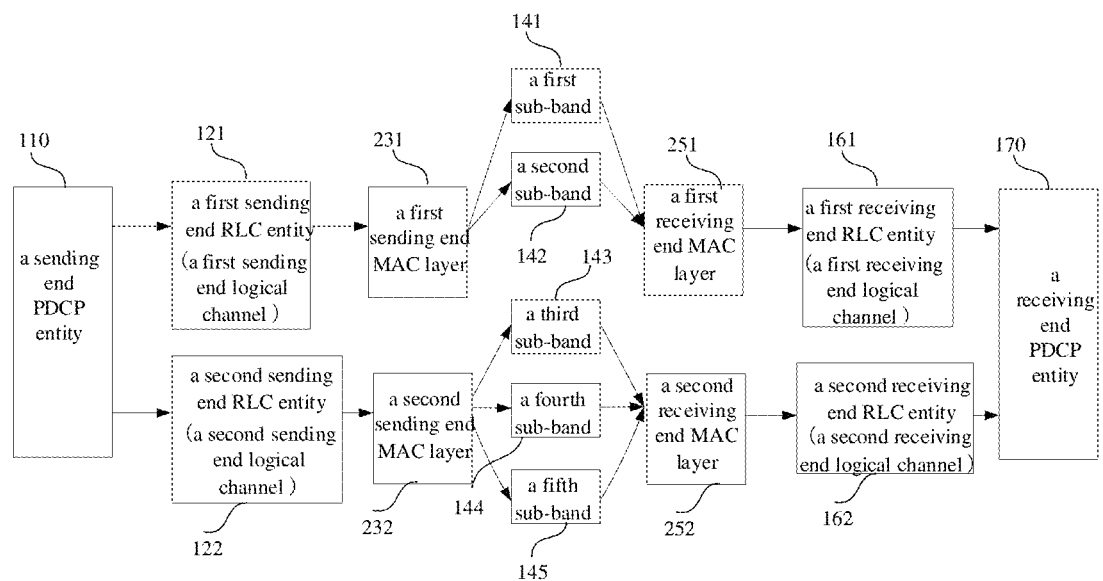
FIG. 2 schematically illustrates another working scenario diagram of a data sending method in prior art.

Referring to FIG. 2, FIG. 2 schematically illustrate another working scenario diagram of a data sending method in prior art. The data sending method can be used in a PDCP duplication function architecture in a Dual Connectivity (DC) scenario.

Referring to FIG. 2, multiple sending end MAC layers and multiple receiving end MAC layers are provided. For example, the multiple sending end MAC layers include a first sending end MAC layer 231 and a second sending end MAC layer 232; the multiple receiving end MAC layers include a first receiving end MAC layer 251 and a second receiving end MAC layer 252.

In some embodiments, each leg is a path from a sending end PDCP entity 110 to a receiving end PDCP entity 170, for example, from a sending end PDCP entity, a sending end RLC entity, a sending end MAC layer, a sub-band, a receiving end MAC layer, a receiving end RLC entity to a receiving end PDCP entity. Specifically, the multiple sending end MAC layers correspond to the multiple sending end RLC entities, and the multiple receiving end MAC layers correspond to the multiple receiving end RLC entities.

In the existing PDCP duplication function architecture in the DC scenario, a plurality of steps, such as configuration, activation and deactivation may be performed to realize the duplication function.

In some embodiments, the configuration step may be similar to that in the CA scenario.

Furthermore, after the configuration step is completed, the activation step is needed to perform the duplication function. The activation/deactivation step is performed by sending an activation/deactivation MAC CE from the network side. The MAC CE includes a bitmap, where each bit of the bitmap corresponds to a RB configured with duplication. Specifically, if a certain bit corresponding to a certain RB is configured with 1, it indicates to activate the certain RB; and if a certain bit corresponding to a certain RB is configured with 0, it indicates to deactivate the certain RB.

In the activation step, after a certain RB configured with duplication is activated, the PDCP layer duplicates the data packet and sends the two same duplicated PDCP Protocol Data Units (PDUs) to two RLC entities corresponding to the RB respectively, and the two RLC entities will send the two same duplicated PDCP PDUs respectively.

In the deactivation step, after a certain RB configured with duplication is deactivated, the UE falls back to a split operation and adopts a relevant configuration of the split operation.

However, in the prior art, in the case of multiple-connectivity duplication, indication accuracy needs to be improved.

Inventors of the present disclosure discovered that, in the prior art, a RB configured with duplication function may be configured with more than two legs for multiple-connectivity duplication, that is, more than two sending end logical channels may be configured. For each RB, it is not clear to use only one bit to indicate how many sending end logical channels to be used are used to send duplicated PDCP data packets, and which sending end logical channels to be used are used for data transmission. Specifically, one bit only includes two states of 0/1, that is, it can only be used to indicate two logical channels, and cannot clearly indicate the use of multi-connectivity duplication.

In embodiments of the present disclosure, multiple bits are used to indicate sending end logical channels to be used for each RB by setting an activation instruction. However in prior art, only one bit is used to indicate sending end logical channels to be used for each RB, which is not clear in the case of multiple-connectivity duplication. According to the embodiments of the present disclosure, when a maximum number n of sending end logical channels of each RB is greater than 2, multiple bits are used to indicate, which facilitates to improve the accuracy of indication and improve the efficiency of transmission resource utilization.

In order to clarify the object, characteristic and advantages of embodiments of the present disclosure, embodiments of present disclosure will be described clearly in detail in conjunction with accompanying drawings.

FIG. 3 schematically illustrates a flow chart of a data sending method according to an embodiment. Referring to FIG. 3, the data sending method includes S31 to S32.

In S31, an activation instruction which includes multiple bits to indicate sending end logical channels to be used for each RB is determined.

In S32, for each RB, according to a number n of the sending end logical channels to be used for the RB, a sending end Packet Data Convergence Protocol (PDCP) entity duplicates a PDCP data packet to generate duplicated PDCP data packets, wherein the duplicated PDCP data packets are sent to a receiving end through the sending end logical channels to be used; and wherein a maximum value of the number n of the sending end logical channels to be used for each RB is greater than 2.

In S31, the operation of determining the activation instruction may be performed in different ways, depending on whether the sending end is a base station or a user equipment.

Specifically, when the sending end is a base station, the operation of determining activation instruction may include: configuring and sending the activation instruction to a user equipment, so that the user equipment determines the sending end logical channels to be used for each RB according to the multiple bits in the activation instruction.

When the sending end is a user equipment, the operation of determining the activation instruction may include: receiving the activation instruction from a base station.

Further, the activation instruction may be transmitted through a MAC CE signaling. It should be noted that in embodiments of the present disclosure, methods of transmitting the activation instruction is not limited.

In some embodiments, each of the multiple bits indicates whether a corresponding sending end logical channel is a sending end logical channel to be used; wherein each bit of the multiple bits has a one-to-one mapping relationship with each sending end logical channel.

In some embodiments, a bit set to be 1 may be used to indicate that a corresponding sending end logical channel is a sending end logical channel to be used, and a bit set to be 0 may be used to indicate that a corresponding sending end logical channel is not a sending end logical channel to be used.

In some embodiments, the one-to-one mapping relationship between each bit of the multiple bits and each sending end logical channel is predefined.

Specifically, for example, the RBs corresponding to the multiple bits and the sending end logical channels may be arranged in an ascending order, which may be predefined through a protocol and cannot be modified.

In some embodiments, the one-to-one mapping relationship between each bit of the multiple bits and each sending end logical channel may be sent from a network side (for example, a base station) to a user equipment, for example, a PDCP duplication configuration information may be configured.

Specifically, before determining the activation instruction, the data sending method further includes: determining the PDCP duplication configuration information.

In some embodiments, in a DC duplication, the PDCP duplication configuration information includes a mapping relationship between each sending end PDCP entity and a sending end logical channel, and the one-to-one mapping relationship between each bit of the multiple bits and each sending end logical channel; wherein each RB corresponds to a sending end PDCP entity.

In some embodiments, in a CA duplication, the PDCP duplication configuration information includes a mapping relationship between each sending end PDCP entity and a sending end logical channel, and the one-to-one mapping relationship between each bit of the multiple bits and each sending end logical channel. The PDCP duplication configuration information may further includes a mapping relationship between the sending end logical channels and sub-bands.

In some embodiments, the PDCP duplication configuration information may include the one-to-one mapping relationship between each bit of the multiple bits and each sending end logical channel in detail. In other embodiments, the PDCP duplication configuration information may only include a sequence of the multiple bits in the activation instruction, so that, after receiving the activation instruction, the user equipment may determine the one-to-one mapping relationship between each bit of the multiple bits and each sending end logical channel.

Figure 4:
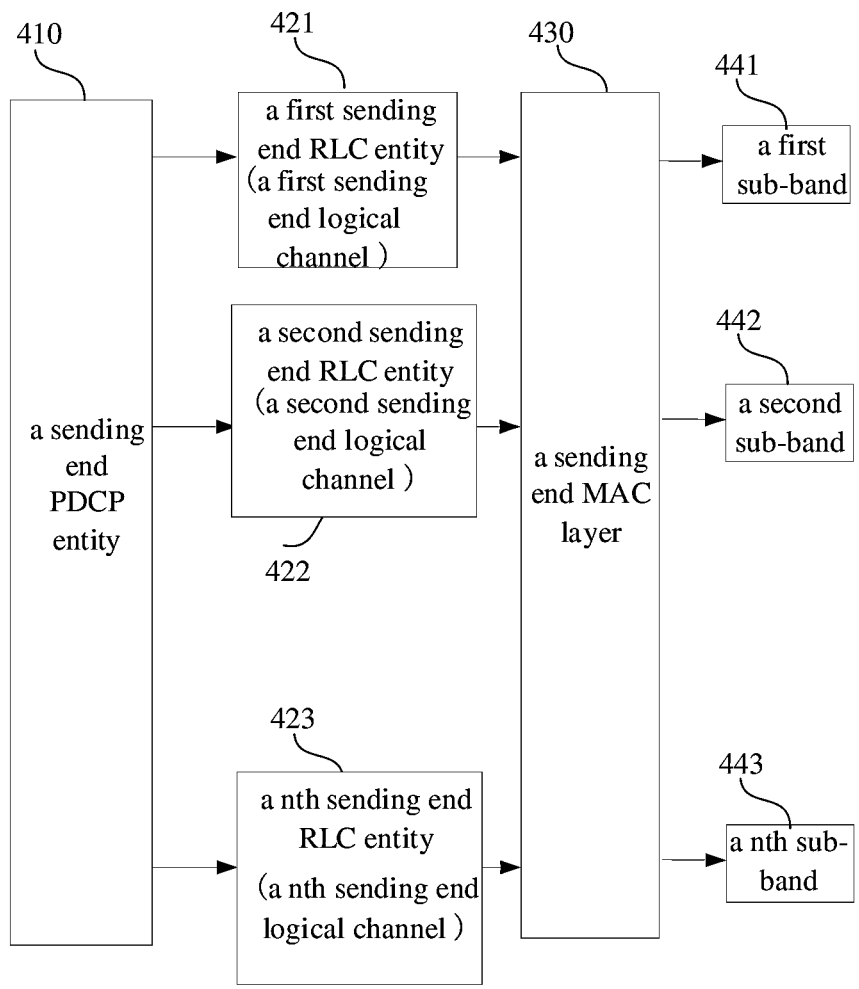
FIG. 4 schematically illustrates a working scenario diagram of a data sending method according to an embodiment.

Referring to FIG. 4, FIG. 4 schematically illustrates a working scenario diagram of a data sending method according to an embodiment.

The data sending method shown in FIG. 4 may be used in a CA duplication, where a RB that is configured with a PDCP duplication includes n legs, that is, n sending end logical channels.

Specifically, a sending end PDCP entity 410 may send PDCP data packets to a first sending end RLC entity 421, a second sending end RLC entity 422, . . . a n-th sending end RLC entity 423, and then the send PDCP data packets may be sent to a sending end MAC layer 430 through a first sending end logical channel corresponding to the first sending end RLC entity 421, a second sending end logical channel corresponding to the second sending end RLC entity 422, . . . a nth sending end logical channel corresponding to the nth sending end RLC entity 423; where n is a positive integer.

Further, the PDCP data packets may be sent through different sub-bands, for example, a first sub-band 441, a second sub-band 442, . . . , a nth sub-band 443.

It should be noted that in embodiments of the present disclosure, numbers of specific sub-bands included in the first sub-band 441, the second sub-band 442, and the nth sub-band 443 are not limited, that is, the first sub-band 441, the second sub-band 442, and the nth sub-band 443 may include a sub-band group respectively.

Figure 5:
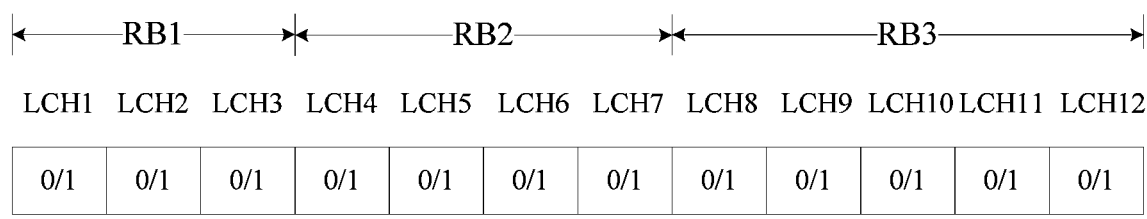
FIG. 5 is a schematic diagram of multiple bits in an activation instruction of a data sending method according to an embodiment.

Referring to FIG. 5, FIG. 5 is a schematic diagram of multiple bits in an activation instruction of a data sending method according to an embodiment.

In some embodiments, in a CA duplication, RBs indicated by multiple bits in the activation instruction are arranged in an order of sequence numbers of the RBs, and the bits indicating a same RB are arranged in an order of sequence numbers of sending end logical channels; and wherein the order of sequence numbers of the RBs and the order of sequence numbers of the sending end logical channels are ascending or descending, and the order of sequence numbers of the RBs and the order of sequence numbers of the sending end logical channels are same or different.

In some embodiments, multiple bits in the activation instruction are configured in two hierarchies: firstly, the RBs may be arranged in an ascending or descending order of sequence numbers of the RBs; secondly, logical channels (LCHs) may be arranged in an ascending or descending order of sequence numbers of the LCHs; and then a value of each bit in the multiple bits may be configured in the order of arrangement. As shown in FIG. 5, the multiple bits in the activation instruction are configured in the ascending order of sequence numbers of the RBS and the sending end logical channels.

In some embodiments, the order of sequence numbers of the RBs and the order of sequence numbers of the sending end logical channels are same or different. That is, the sequence numbers of the RBs may be arranged in the ascending order, but the sequence numbers of the sending end logical channels may be arranged in the descending order, or, the sequence numbers of the RBs may be arranged in the descending order, but the sequence numbers of the sending end logical channels may be arranged in the ascending order.

Figure 6:
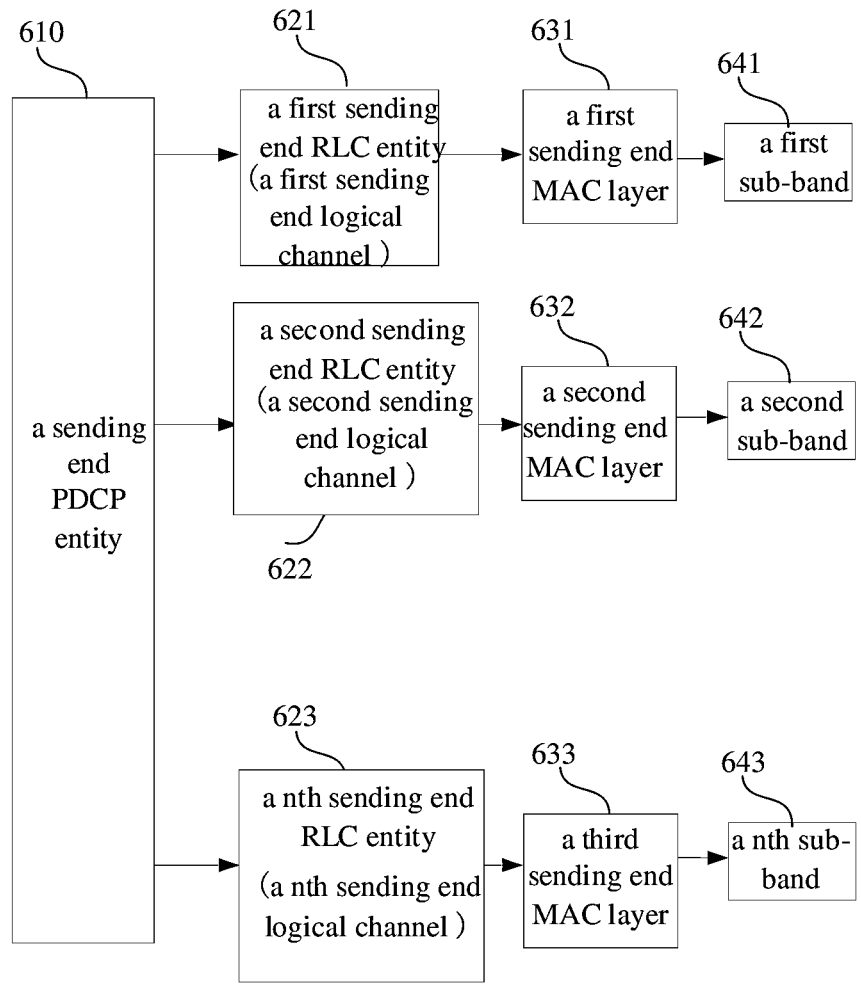
FIG. 6 schematically illustrates a working scenario diagram of a data sending method according to another embodiment.

Referring to FIG. 6, FIG. 6 is a schematic diagram of multiple bits in an activation instruction of a data sending method according to another embodiment.

The data sending method shown in FIG. 6 may be used in a DC duplication, where RBs configured with PDCP duplication function has n legs.

In some embodiments, a sending end PDCP entity 610 may send PDCP data packets to a first sending end RLC entity 621, a second sending end RLC entity 622, . . . a nth sending end RLC entity 623, and the PDCP data packets are sent to a first sending end MAC layer 631 through a first sending end logical channel corresponding to the first sending end RLC entity 621, a second sending end MAC layer 632 through a first sending end logical channel corresponding to the second sending end RLC entity 622, and a nth sending end MAC layer 633 through a nth sending end logical channel corresponding to the nth sending end RLC entity 623, where n is a positive integer.

Further, the PDCP data packets may be sent through different sub-bands respectively. For example, a PDCP data packet sent by the first sending end logical channel may be sent through a first sub-band 641, and a PDCP data packet sent by the second sending end logical channel may be sent through a second sub-band 642, and a PDCP data packet sent by the nth sending end logical channel may be sent through a nth sub-band 643.

It should be noted that in embodiments of the present disclosure, numbers of specific sub-bands included in the first sub-band 641, the second sub-band 642, and the nth sub-band 643 are not limited, that is, the first sub-band 641, the second sub-band 642, and the nth sub-band 643 may include a sub-band group respectively.

Figure 7:
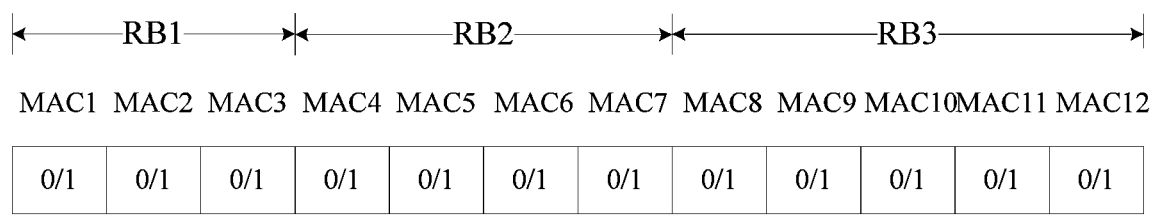
FIG. 7 is a schematic diagram of multiple bits in an activation instruction of a data sending method according to another embodiment.

Referring to FIG. 7, FIG. 7 is a schematic diagram of multiple bits in an activation instruction of a data sending method according to another embodiment.

In a DC duplication, RBs indicated by multiple bits in an activation instruction are arranged in an order of sequence numbers of the RBs, and bits indicating a same RB are arranged in an order of sequence numbers of sending end MAC layers, wherein the order of sequence numbers of the RBs and the order of sequence numbers of the sending end MAC layers are ascending or descending, and the order of sequence numbers of the RBs and the order of sequence numbers of the sending end MAC layers are same or different.

In some embodiments, the multiple bits in the activation instruction are configured in two hierarchies: firstly, the RBs may be arranged in an ascending or descending order of sequence numbers of the RBs; secondly, the sending end logical channels may be arranged in an ascending or descending order of sequence numbers of the sending end logical channels; and then a value of each bit in the multiple bits may be configured in the order of arrangement. As shown in FIG. 5, the multiple bits in the activation instruction are configured in the ascending order of sequence numbers of the RBS and the sending end logical channels.

In some embodiments, the order of sequence numbers of the RBs and the order of sequence numbers of the sending end logical channels are same or different. That is, the sequence numbers of the RBs may be arranged in the ascending order, but the sequence numbers of the sending end logical channels may be arranged in the descending order, or, the sequence numbers of the RBs may be arranged in the descending order, but the sequence numbers of the sending end logical channels may be arranged in the ascending order.

According to the embodiments of the present disclosure, the activation instruction uses each of the multiple bits of the activation instruction to indicate whether a corresponding sending end logical channel is a sending end logical channel to be used, so that the sending end can determine whether a sender logical channel corresponding to each bit of the multiple bits is a sending logical channel to be used, so that the sending end logical channel to be used is determined when data needs to be sent.

In some embodiments, a value of the multiple bits indicating a RB indicates the number n of the sending end logical channels to be used for each RB, where the sending end logical channels of each RB are arranged in a preset order; and according to the preset order, top n sending end logical channels are selected as the sending end logical channels to be used for each RB.

Specifically, the multiple bits in the activation instruction are used to indicate the number n of the sending end logical channel to be used for each RB in the multiple RBs respectively, that is, the value of the multiple bits indicating a RB indicates the number n of the sending end logical channels to be used for each RB, and the UE is defaulted to use the first n sending end logical channels.

In some embodiments, the preset order may be used to indicate priorities of the sending end logical channels in each RB. For example, a sending end logical channel with a higher priority may be set to have a smaller sequence number, so that the sending end logical channel with a higher priority is more likely to be selected.

In some embodiments, before determining the activation instruction, the method further includes: determining a PDCP duplication configuration information.

In a DC duplication, the PDCP duplication configuration information includes a mapping relationship between each PDCP entity and each sending end logical channel, and the preset order of the sending end logical channels of each RB.

In a CA duplication, the PDCP duplication configuration information includes a mapping relationship between each PDCP entity and each sending end logical channel, and the preset order of the sending end logical channels of each RB, and a mapping relationship between the sending end logical channels and sub-bands.

Figure 8:
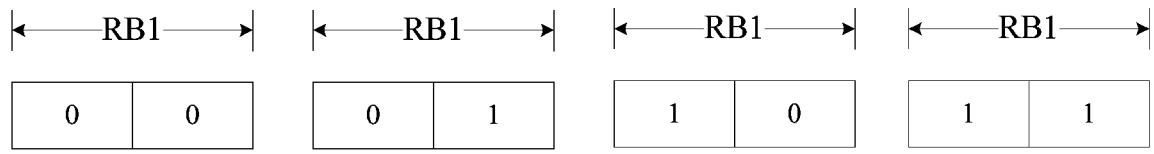
FIG. 8 is a schematic diagram of multiple bits indicating a same RB in an activation instruction of a data sending method according to an embodiment.

Referring to FIG. 8, FIG. 8 is a schematic diagram of multiple bits indicating a same RB in an activation instruction of a data sending method according to an embodiment.

As shown in FIG. 8, when multiple bits indicating a RB (i.e. RB1) is "00", a value of the multiple bits is 0 and a number n of sending end logical channels to be used for RB1 indicated by the multiple bits is 0, that is, all three sending end logical channels are not used; when multiple bits bit indicating the RB (i.e. RB1) is "01", a value of the multiple bits is 1 and a number n of sending end logical channels to be used for RB1 indicated by the multiple bits is 1, that is, a first sending end logical channel is used; when multiple bits of indicating a RB (i.e. RB1) is "10", a value of the multiple bits is 2 and a number n of sending end logical channels to be used for RB1 indicated by the multiple bits is 2, that is, first two sending end logical channels are used; when multiple bits indicating a RB (i.e. RB1) is "11", a value of the multiple bits is 3 and a number n of sending end logical channels to be used for RB1 indicated by the multiple bits is 3, that is, first 3 sending end logical channels are used.

In some embodiments, the multiple bits in the activation instruction are configured in two hierarchies: firstly, the RBs may be arranged in an ascending or descending order of sequence numbers of the RBs; secondly, for each RB, a value of one or multiple bits may be use to indicate the number n.

In some embodiments, the number of bits used to indicate the sending end logical channels to be used for each RB is determined according to a following formula:

$$b_i = \lceil \log_2(n_i+1) \rceil.$$

In the formula, bi represents a number of bits in the activation instruction indicating sending end logical channels to be used for an i-th RB; and $n_i$ represents a number of sending end logical channels of the i-th RB.

It should be noted that in the embodiments of the present disclosure, the multiple bits used to indicate the sending end logical channels to be used for different RBs may be same or different. If the number of the sending end logical channels to be used changes, the multiple bits used to indicate the sending end logical channels to be used may also change accordingly. Specifically, the user equipment may calculate to determine the multiple bits used to indicate the sending end logical channels to be used for each RB according to the above formula, and then determine the sending end logical channels to be used for each RB.

In the embodiments of the present disclosure, the activation instruction uses the value of the multiple bits indicating each RB to indicate the number n of the sending end logical channels to be used, wherein the sending end logical channels of each RB are arranged in a preset order; according to the preset order, top n sending end logical channels are selected as the sending end logical channels to be used. In the embodiment of the present disclosure, the sending end may use fewer bits to indicate the sending end logical channels to be used, so that the sending end can determine the sending end logical channels to be used of each RB according to the value of the multiple bits indicating the RB and the preset order, and determine the sending end logical channels when data needs to be sent.

In some embodiments, the multiple bits used to indicate the sending end logical channels to be used for each RB are a preset number of bits, and before determining the activation instruction, the data sending method further includes: determining a PDCP duplication configuration information, wherein the PDCP duplication configuration information includes a mapping relationship between each PDCP entity and each sending end logical channel, the preset order of the sending end logical channels of each RB and the preset number of bits.

In some embodiments, in the CA duplication, the PDCP duplication configuration information further includes a mapping relationship between the sending end logical channels and sub-bands.

According to the embodiments of the present disclosure, a preset number of bits may be used to represent each RB in a received instruction, and the sending end may separate the multiple bits corresponding to each RB without calculation, which facilitates to reduce computational complexity.

In some embodiments, before determining the activation instruction, the data sending method further includes: determining a PDCP duplication configuration information, wherein the PDCP duplication configuration information includes a mapping relationship between each PDCP entity and each sending end logical channel, the preset order of the sending end logical channels of each RB, and a preset value of a maximum number of the sending end logical channels of each RB.

In some embodiments, the PDCP duplication configuration information further includes a mapping relationship between the sending end logical channels and sub-bands.

In some embodiments, a number of bits used to indicate the sending end logical channels to be used for each RB is determined according to a following formula:

$$b_i = \lceil \log_2(N+1) \rceil;$$

In the formula, $b_i$ represents a number of bits in the activation instruction indicating sending end logical channels to be used for an i-th RB; and N represents the maximum number of the sending end logical channels of each RB.

Specifically, for all RBs, since numbers of configured sending end logical channels are not greater than N, the number of bits calculated according to the above formula can completely indicate all legs which are configured with the replication function. In other words, for all RBs configured with the duplication function, the number of bits may be set to be $b_i$ calculated according to the above formula, even if the number of legs changes, $b_i$ does not need to be changed.

According to the embodiments of the present disclosure, the activation instruction may use the preset number of bits to indicate each RB, and the sender does not need to calculate for each RB separately. In other words, multiple bits corresponding to each RB may be separated according to $b_i$, which facilitates to reduce computational complexity.

Still referring to FIG. 3, in S32, for each RB, according to the number n of the sending end logical channels to be used by the RB, the sending end PDCP entity duplicates the PDCP data packet to generate duplicated PDCP data packets and sends the duplicated PDCP data packets to a receiving end through the sending end logical channels to be used, where a maximum value of the number n of the sending end logical channels of each RB is greater than 2.

In some embodiments, the PDCP entity receives a data packet from an upper layer and duplicates it at the PDCP entity's layer. Specifically, if the number of the sending end logical channels to be used is N, the PDCP entity duplicates the PDCP data packet (N−1) times to obtain N PDCP data packets in total, and then sends the original PDCP data packet and the duplicated (N−1) PDCP data packets to the receiver through the sending end logical channels.

According to the embodiments of the present disclosure, multiple bits are used to indicate sending end logical channels to be used for each RB by setting an activation instruction. However in prior art, only one bit is used to indicate sending end logical channels to be used for each RB, which is not clear in the case of multiple-connectivity duplication. According to the embodiments of the present disclosure, when a maximum number n of sending end logical channels of each RB is greater than 2, multiple bits are used to indicate, which facilitates to improve the accuracy of indication and improve the efficiency of transmission resource utilization.

Figure 9:
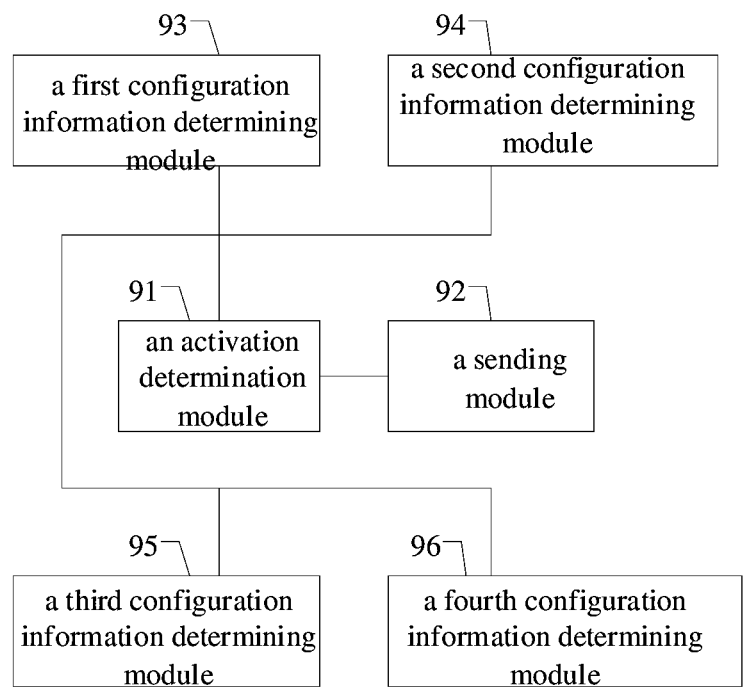
FIG. 9 is a structural diagram of a data sending device according to an embodiment.

Referring to FIG. 9, FIG. 9 is a structural diagram of a data sending device according to an embodiment. The data sending device includes:

an activation determination module 91, adapted to determine an activation instruction which includes multiple bits to indicate sending end logical channels to be used for each RB;

a sending module 92, adapted to, for each RB, send duplicated Packet Data Convergence Protocol (PDCP) data packets to a receiving end through the sending end logical channels to be used, wherein the duplicated PDCP data packets are generated by a sending end PDCP entity duplicating a PDCP data packet according to a number n of the sending end logical channels to be used for the RB; wherein a maximum value of the number n of the sending end logical channels to be used for each RB is greater than 2;

a first configuration information determining module 93, adapted to, before determining the activation instruction, determine a PDCP duplication configuration information, wherein the PDCP duplication configuration information includes a mapping relationship between each sending end PDCP entity and a sending end logical channel, and the one-to-one mapping relationship between each bit of the multiple bits and each sending end logical channel; wherein each RB corresponds to a sending end PDCP entity;

a second configuration information determining module 94, adapted to, before determining the activation instruction, determine a PDCP duplication configuration information, wherein the PDCP duplication configuration information includes a mapping relationship between each PDCP entity and each sending end logical channel, and the preset order of the sending end logical channels of each RB;

a third configuration information determining module 95, adapted to determine a PDCP duplication configuration information, wherein the PDCP duplication configuration information includes a mapping relationship between each PDCP entity and each sending end logical channel, the preset order of the sending end logical channels of each RB, and the preset number of bits; and a fourth configuration information determining module 96, adapted to determine a PDCP duplication configuration information, wherein the PDCP duplication configuration information includes a mapping relationship between each PDCP entity and each sending end logical channel, the preset order of the sending end logical channels of each RB, and a preset value of a maximum number of the sending end logical channels of each RB.

In some embodiments, each of the multiple bits indicates whether a corresponding sending end logical channel is a sending end logical channel to be used; wherein each bit of the multiple bits has a one-to-one mapping relationship with each sending end logical channel.

In some embodiments, the one-to-one mapping relationship between each bit of the multiple bits and each sending end logical channel is predefined.

In some embodiments, the PDCP duplication configuration information further includes a mapping relationship between the sending end logical channels and sub-bands.

In some embodiments, in a Dual Connectivity (DC) duplication, RBs indicated by the multiple bits in the activation instruction are arranged in an order of sequence numbers of the RBs, and the bits indicating a same RB are arranged in an order of sequence numbers of sending end MAC layers; and wherein the order of sequence numbers of the RBs and the order of sequence numbers of the sending end MAC layers are ascending or descending, and the order of sequence numbers of the RBs and the order of sequence numbers of the sending end MAC layers are same or different.

In some embodiments, in a CA duplication, RBs indicated by the multiple bits in the activation instruction are arranged in an order of sequence numbers of the RBs, and the bits indicating a same RB are arranged in an order of sequence numbers of the sending end logical channels; and wherein the order of sequence numbers of the RBs and the order of sequence numbers of the sending end logical channels are ascending or descending, and the order of sequence numbers of the RBs and the order of sequence numbers of the sending end logical channels are same or different.

In some embodiments, a value of the multiple bits indicating a RB indicates the number n of the sending end logical channels to be used for each RB, where the sending end logical channels of each RB are arranged in a preset order; and according to the preset order, top n sending end logical channels are selected as the sending end logical channels to be used for each RB.

In some embodiments, the PDCP duplication configuration information further includes a mapping relationship between the sending end logical channels and sub-bands.

In some embodiments, a number of bits used to indicate the sending end logical channels to be used for each RB is determined according to a following formula: $b_i = \lceil \log_2(n_i + 1) \rceil$; wherein $b_i$ represents a number of bits in the activation instruction indicating sending end logical channels to be used for an i-th RB; and $n_i$ represents a number of sending end logical channels of the i-th RB.

In some embodiments, the multiple bits used to indicate the sending end logical channels to be used for each RB are a preset number of bits, and the data sending device further includes: a third configuration information determining module, adapted to determine a PDCP duplication configuration information before determining the activation instruction, wherein the PDCP duplication configuration information includes a mapping relationship between each PDCP entity and each sending end logical channel, the preset order of the sending end logical channels of each RB, and the preset number of bits.

In some embodiments, a number of bits used to indicate the sending end logical channels to be used for each RB is determined according to a following formula: $b_i = \lceil \log_2(N + 1) \rceil$; wherein $b_i$ represents a number of bits in the activation instruction indicating sending end logical channels to be used for an i-th RB; and N represents the maximum number of the sending end logical channels of each RB.

In some embodiments, the PDCP duplication configuration information further includes a mapping relationship between the sending end logical channels and sub-bands.

Principles, detailed implementation and advantages of the device for determining an uplink multiplexed time-frequency resource can be found in the above descriptions of the method as shown in FIG. 1 to FIG. 8, and are not described here.

In an embodiment of the present disclosure, a storage medium having computer instructions stored therein is provided, wherein once the computer instructions are executed, the above data sending method illustrated in FIG. 3 is performed. The storage medium may be a computer readable storage medium, for example, including a non-volatile or non-transitory memory, an optical disk, a mechanical disk, a solid disk or the like.

In an embodiment of the present disclosure, a sending end including a memory and a processor is provided, wherein the memory has computer instructions stored therein, and when the processor executes the computer instructions, the above method as shown in FIG. 3 is performed. The sending end may include but not limited to a network equipment such as a base stations or a server, and a terminal equipment such as a mobile phone, a computers or a tablet.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A data sending method, comprising:
determining an activation instruction which comprises multiple bits to indicate sending end logical channels to be used for each Radio Bearer (RB); and
for each RB, according to a number n of the sending end logical channels to be used for the RB, a sending end Packet Data Convergence Protocol (PDCP) entity duplicating a PDCP data packet and sending duplicated PDCP data packets to a receiving end through the sending end logical channels to be used;
wherein a maximum value of the number n of the sending end logical channels to be used for each RB is greater than 2,
wherein a value of the multiple bits indicating a RB indicates the number n of the sending end logical channels to be used for each RB, where the sending end logical channels of each RB are arranged in a preset order; and according to the preset order, top n sending end logical channels are selected as the sending end logical channels to be used for each RB,
wherein a number of bits used to indicate the sending end logical channels to be used for each RB is determined according to a following formula: $b_i = \lceil \log_2(n_i+1) \rceil$; and
wherein $b_i$ represents a number of bits in the activation instruction indicating sending end logical channels to be used for an i-th RB; and $n_i$ represents a number of sending end logical channels of the i-th RB and is not zero.

2. The data sending method according to claim 1, wherein each of the multiple bits indicates whether a corresponding sending end logical channel is a sending end logical channel to be used; wherein each bit of the multiple bits has a one-to-one mapping relationship with each sending end logical channel.

3. The data sending method according to claim 2, wherein the one-to-one mapping relationship between each bit of the multiple bits and each sending end logical channel is predefined.

4. The data sending method according to claim 2, wherein before determining the activation instruction, the data sending method further comprises:
determining a PDCP duplication configuration information, wherein the PDCP duplication configuration information comprises a mapping relationship between each sending end PDCP entity and a sending end logical channel, and the one-to-one mapping relationship between each bit of the multiple bits and each sending end logical channel; wherein each RB corresponds to a sending end PDCP entity.

5. The data sending method according to claim 4, wherein the PDCP duplication configuration information further comprises a mapping relationship between the sending end logical channels and sub-bands.

6. The data sending method according to claim 2, wherein in a Carrier Aggregation (CA) duplication, RBs indicated by the multiple bits in the activation instruction are arranged in an order of sequence numbers of the RBs, and the bits indicating a same RB are arranged in an order of sequence numbers of the sending end logical channels; and wherein the order of sequence numbers of the RBs and the order of sequence numbers of the sending end logical channels are ascending or descending, and the order of sequence numbers of the RBs and the order of sequence numbers of the sending end logical channels are same or different.

7. The data sending method according to claim 2, wherein in a Dual Connectivity (DC) duplication, RBs indicated by the multiple bits in the activation instruction are arranged in an order of sequence numbers of the RBs, and the bits indicating a same RB are arranged in an order of sequence numbers of sending end Media Access Control (MAC) layers; and wherein the order of sequence numbers of the RBs and the order of sequence numbers of the sending end MAC layers are ascending or descending, and the order of sequence numbers of the RBs and the order of sequence numbers of the sending end MAC layers are same or different.

8. The data sending method according to claim 1, wherein before determining the activation instruction, the data sending method further comprises:
determining a PDCP duplication configuration information, wherein the PDCP duplication configuration information comprises a mapping relationship between each PDCP entity and each sending end logical channel, and the preset order of the sending end logical channels of each RB.

9. The data sending method according to claim 8, wherein the PDCP duplication configuration information further comprises a mapping relationship between the sending end logical channels and sub-bands.

10. A data sending method, comprising:
determining an activation instruction which comprises multiple bits to indicate sending end logical channels to be used for each Radio Bearer (RB); and
for each RB, according to a number n of the sending end logical channels to be used for the RB, a sending end Packet Data Convergence Protocol (PDCP) entity duplicating a PDCP data packet and sending duplicated PDCP data packets to a receiving end through the sending end logical channels to be used;
wherein a maximum value of the number n of the sending end logical channels to be used for each RB is greater than 2,
wherein a value of the multiple bits indicating a RB indicates the number n of the sending end logical channels to be used for each RB, where the sending end logical channels of each RB are arranged in a preset order; and according to the preset order, top n sending end logical channels are selected as the sending end logical channels to be used for each RB
wherein before determining the activation instruction, the data sending method further comprises:

determining a PDCP duplication configuration information, wherein the PDCP duplication configuration information comprises a mapping relationship between each PDCP entity and each sending end logical channel, the preset order of the sending end logical channels of each RB, and a preset value of a maximum number of the sending end logical channels of each RB, wherein a number of bits used to indicate the sending end logical channels to be used for each RB is determined according to a following formula: $b_i = \lceil \log_2(N+1) \rceil$;

wherein $b_i$ represents a number of bits in the activation instruction indicating sending end logical channels to be used for an i-th RB; and N represents the maximum number of the sending end logical channels of each RB and is not zero.

11. The data sending method according to claim 10, wherein the PDCP duplication configuration information further comprises a mapping relationship between the sending end logical channels and sub-bands.

12. The data sending method according to claim 10, wherein each of the multiple bits indicates whether corresponding sending end logical channel is a sending end logical channel to be used; wherein each bit of the multiple bits has a one-to-one mapping relationship with each sending end logical channel.

13. The data sending method according to claim 12, wherein the one-to-one mapping relationship between each bit of the multiple bits and each sending end logical channel is predefined.

14. The data sending method according to claim 12, wherein before determining the activation instruction, the data sending method further comprises:

determining a PDCP duplication configuration information, wherein the PDCP duplication configuration information comprises a mapping relationship between each sending end PDCP entity and a sending end logical channel, and the one-to-one mapping relationship between each bit of the multiple bits and each sending end logical channel; wherein each RB corresponds to a sending end PDCP entity.

15. The data sending method according to claim 14, wherein the PDCP duplication configuration information further comprises a mapping relationship between the sending end logical channels and sub-bands.

16. The data sending method according to claim 12, wherein in a Carrier Aggregation (CA) duplication, RBs indicated by the multiple bits in the activation instruction are arranged in an order of sequence numbers of the RBs, and the bits indicating a same RB are arranged in an order of sequence numbers of the sending end logical channels; and wherein the order of sequence numbers of the RBs and the order of sequence numbers of the sending end logical channels are ascending or descending, and the order of sequence numbers of the RBs and the order of sequence numbers of the sending end logical channels are same or different.

17. The data sending method according to claim 12, wherein in a Dual Connectivity (DC) duplication, RBs indicated by the multiple bits in the activation instruction are arranged in an order of sequence numbers of the RBs, and the bits indicating a same RB are arranged in an order of sequence numbers of sending end Media Access Control (MAC) layers; and wherein the order of sequence numbers of the RBs and the order of sequence numbers of the sending end MAC layers are ascending or descending, and the order of sequence numbers of the RBs and the order of sequence numbers of the sending end MAC layers are same or different.

18. The data sending method according to claim 10, wherein before determining the activation instruction, the data sending method further comprises:

determining a PDCP duplication configuration information, wherein the PDCP duplication configuration information comprises a mapping relationship between each PDCP entity and each sending end logical channel, and the preset order of the sending end logical channels of each RB.

19. The data sending method according to claim 18, wherein the PDCP duplication configuration information further comprises a mapping relationship between the sending end logical channels and sub-bands.

20. A non-transitory storage medium having computer instructions stored therein, wherein once the computer instructions are executed, the data sending method according to claim 1 is performed.

21. A sending end comprising a memory and a processor, wherein the memory stores one or more programs, the one or more programs comprising computer instructions, which, when executed by the processor, cause the processor to:

determine an activation instruction which comprises multiple bits to indicate sending end logical channels to be used for each Radio Bearer (RB); and for each RB, according to a number n of the sending end logical channels to be used for the RB, make a sending end Packet Data Convergence Protocol (PDCP) entity duplicate a PDCP data packet and send duplicated PDCP data packets to a receiving end through the sending end logical channels to be used;

wherein a maximum value of the number n of the sending end logical channels to be used for each RB is greater than 2, wherein a value of the multiple bits indicating an RB indicates the number n of the sending end logical channels to be used for each RB, where the sending end logical channels of each RB are arranged in a preset order; and according to the preset order, top n sending end logical channels are selected as the sending end logical channels to be used for each RB, wherein a number of bits used to indicate the sending end logical channels to be used for each RB is determined according to a following formula: $b_i = \lceil \log_2(n_i+1) \rceil$;

wherein $b_i$ represents a number of bits in the activation instruction indicating sending end logical channels to be used for an i-th RB; and $n_i$ represents a number of sending end logical channels of the i-th RB and is not zero.

* * * * *